United States Patent
Nishizaki et al.

(10) Patent No.: US 6,698,542 B2
(45) Date of Patent: Mar. 2, 2004

(54) STEERING DEVICE FOR VEHICLE

(75) Inventors: Katsutoshi Nishizaki, Nabari (JP); Shirou Nakano, Minamikawachi-gun (JP); Takanobu Takamatsu, Habikino (JP); Masaya Segawa, Yamatokooriyama (JP); Ryouhei Hayama, Nabari (JP); Kazuhiro Kato, Itami (JP)

(73) Assignees: Koyo Seiko Co., Ltd., Osaka (JP); Sumimoto (SEI) Brake Systems, Inc., Mie-pref (JP)

( * ) Notice: Subject to any disclaimer, the term of this patent is extended or adjusted under 35 U.S.C. 154(b) by 106 days.

(21) Appl. No.: 10/075,212

(22) Filed: Feb. 13, 2002

(65) Prior Publication Data

US 2002/0117347 A1 Aug. 29, 2002

(30) Foreign Application Priority Data

Feb. 13, 2001 (JP) ........................................ 2001-035691

(51) Int. Cl.⁷ ................................................ B62D 5/00
(52) U.S. Cl. ........................ 180/403; 180/402; 180/422; 701/41; 701/42
(58) Field of Search ................................. 180/421, 422, 180/402, 403; 701/41–44

(56) References Cited

U.S. PATENT DOCUMENTS

| | | | | |
|---|---|---|---|---|
| 4,453,615 A | * | 6/1984 | Kanazawa et al. | 180/422 |
| 4,730,687 A | * | 3/1988 | Chikuma et al. | 180/422 |
| 5,341,296 A | * | 8/1994 | Yasuno et al. | 701/70 |
| 6,179,389 B1 | * | 1/2001 | Freitag et al. | 303/2 |
| 6,336,519 B1 | * | 1/2002 | Bohner et al. | 180/403 |
| 6,415,212 B2 | * | 7/2002 | Nishizaki et al. | 701/41 |

* cited by examiner

Primary Examiner—Lesley D. Morris
Assistant Examiner—L. Lum
(74) Attorney, Agent, or Firm—Jordan and Hamburg LLP

(57) ABSTRACT

The steering device for vehicle changes the steering angle by transmitting the movements of the steering electrical actuator to the vehicle wheels. When the vehicle is steered in the stationary state, the hydraulic fluid can be supplied to the steering assistance force generating hydraulic actuator from the pump within the hydraulic pressure imparting unit. When the vehicle is not steered in the stationary state, the hydraulic fluid can be supplied to the brake device from the pump via the hydraulic pressure distribution unit.

3 Claims, 8 Drawing Sheets

Fig.5 (1)
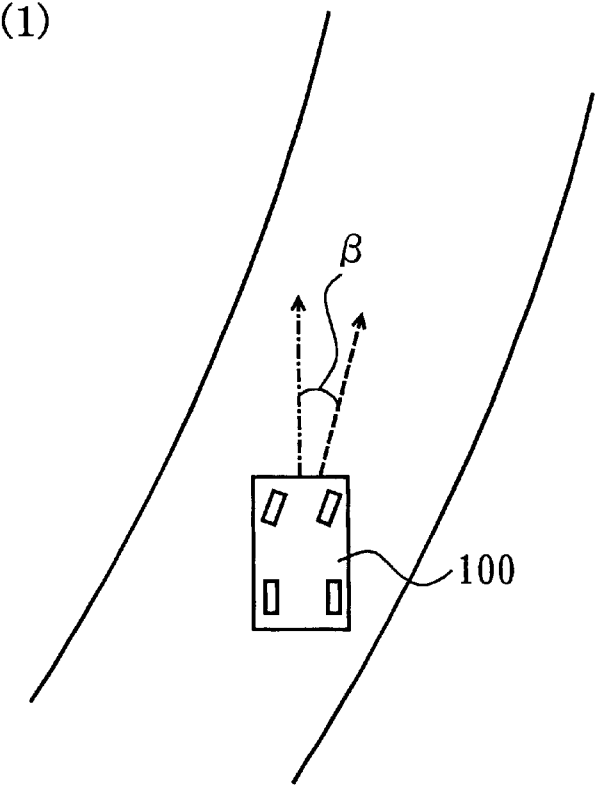
Fig.5 (2)
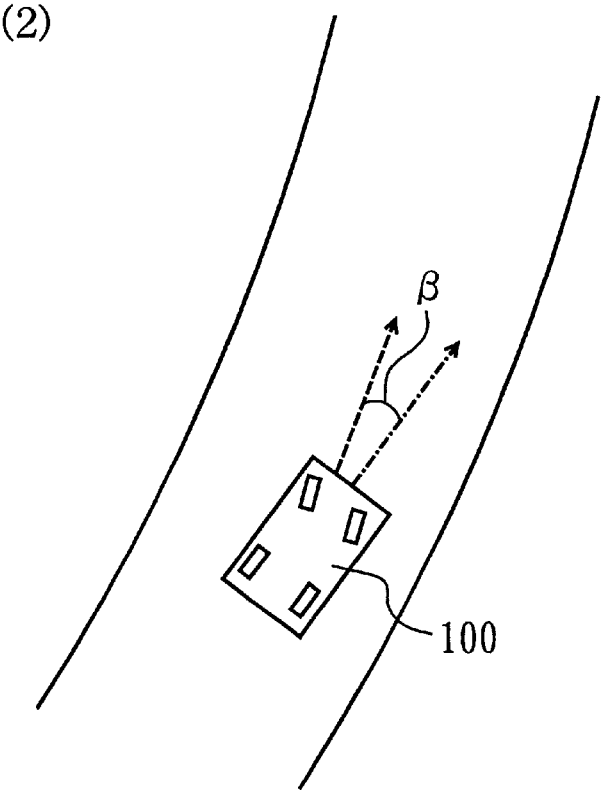

STEERING DEVICE FOR VEHICLE

FIELD OF THE INVENTION

The present invention relates to a steering device for vehicle which changes the steering angle in response to the movement of an electrical actuator.

DESCRIPTION OF THE RELATED ART

In a steering device for vehicle adopting a steer-by-wire system, movements of an electrical actuator for steering in response to operation of a steering wheel or other operation member are transmitted to the vehicle wheels such that the steering angle changes without mechanically linking the operation member to the vehicle wheels. It has been proposed that vehicles adopting such a steer-by-wire system calculate a target yaw rate or other target value corresponding to the vehicle behavior according to the amount of operation of an operation member, and execute control of the steering angle via the steering electrical actuator such that the target yaw rate or other target value coincides with the actual yaw rate or other actual value. It has also been proposed that, in order to prevent instability of vehicle behavior in cases where the friction coefficient between the road surface and vehicle wheels is reduced due to freezing of the road surface or other causes, the vehicle braking force is controlled such that the target yaw rate or other target value coincide with the actual yaw rate or other actual value. In addition, enhancement of the stability of vehicle behavior through integration of steering angle control and braking force control is also being studied.

It is required that the output of the steering electrical actuator overcomes the steering resistance arising from friction between the vehicle wheels and the road surface. In a steering device for vehicle adopting a steer-by-wire system in particular, if a steering force is to be generated solely by a steering electrical actuator, a large output is required. Consequently there is the problem that the steering electrical actuator must be large, so that actual application of a steer-by-wire system is difficult.

An object of this invention is to provide a steering device for vehicle which can resolve the above problem.

SUMMARY OF THE INVENTION

The steering device for vehicle of the present invention comprises a steering electrical actuator; means for transmitting movement of the steering electrical actuator to vehicle wheels such that steering angle changes according to the movement; a pump to supply hydraulic fluid; a brake device; a steering assistance force generation hydraulic actuator; means for judging whether the vehicle is steered in a stationary state; and, means for switching the supply route of the hydraulic fluid in response to the judgment result such that, the hydraulic fluid can be supplied from the pump to the steering assistance force generation hydraulic actuator when the vehicle is steered in the stationary state, and the hydraulic fluid can be supplied from the pump to the brake device when the vehicle is not steered in the stationary state.

During steering at zero vehicle speed, that is, when the vehicle is steered in the stationary state, there is no need to amplify or control the braking force of the brake device. Therefore, when the steering angle is steered by means of the steering electrical actuator in the stationary state, the hydraulic pressure for braking can be diverted to assist the steering. Thus by means of the arrangement of the present invention, the steering electrical actuator can be made small and lightweight, and the energy efficiency of the vehicle can be improved.

It is preferable that the movement of the steering electrical actuator is transmitted to the vehicle wheels without mechanical linkage of the operation member with the vehicle wheels. By this means, the utility of a vehicle adopting a steer-by-wire system can be improved.

It is preferable that the means for transmitting the movement of the steering electrical actuator to the vehicle wheels is comprised of a steering gear; that the means for switching the supply route of the hydraulic fluid is comprised of an electromagnetic switching valve; and that the means to judging whether the vehicle is steered in the stationary state is comprised of a computer.

According to the present invention, the hydraulic pressure for braking is diverted to assist steering when the steering angle is changed by means of the electrical actuator in the stationary state, and thus a steering device for vehicle can be provided in which the electrical actuator can be made smaller and lightweight without complicating the constitution, the energy efficiency of the vehicle can be improved, and the utility of a vehicle adopting a steer-by-wire system can be enhanced.

BRIEF DESCRIPTION OF THE DRAWINGS

FIG. 5(1) is a figure showing a vehicle which has slipped laterally in an oversteering state, FIG. 5(2) is a figure showing a vehicle which has slipped laterally in an understeering state;

DESCRIPTION OF THE PREFERRED EMBODIMENTS

Figure 1:
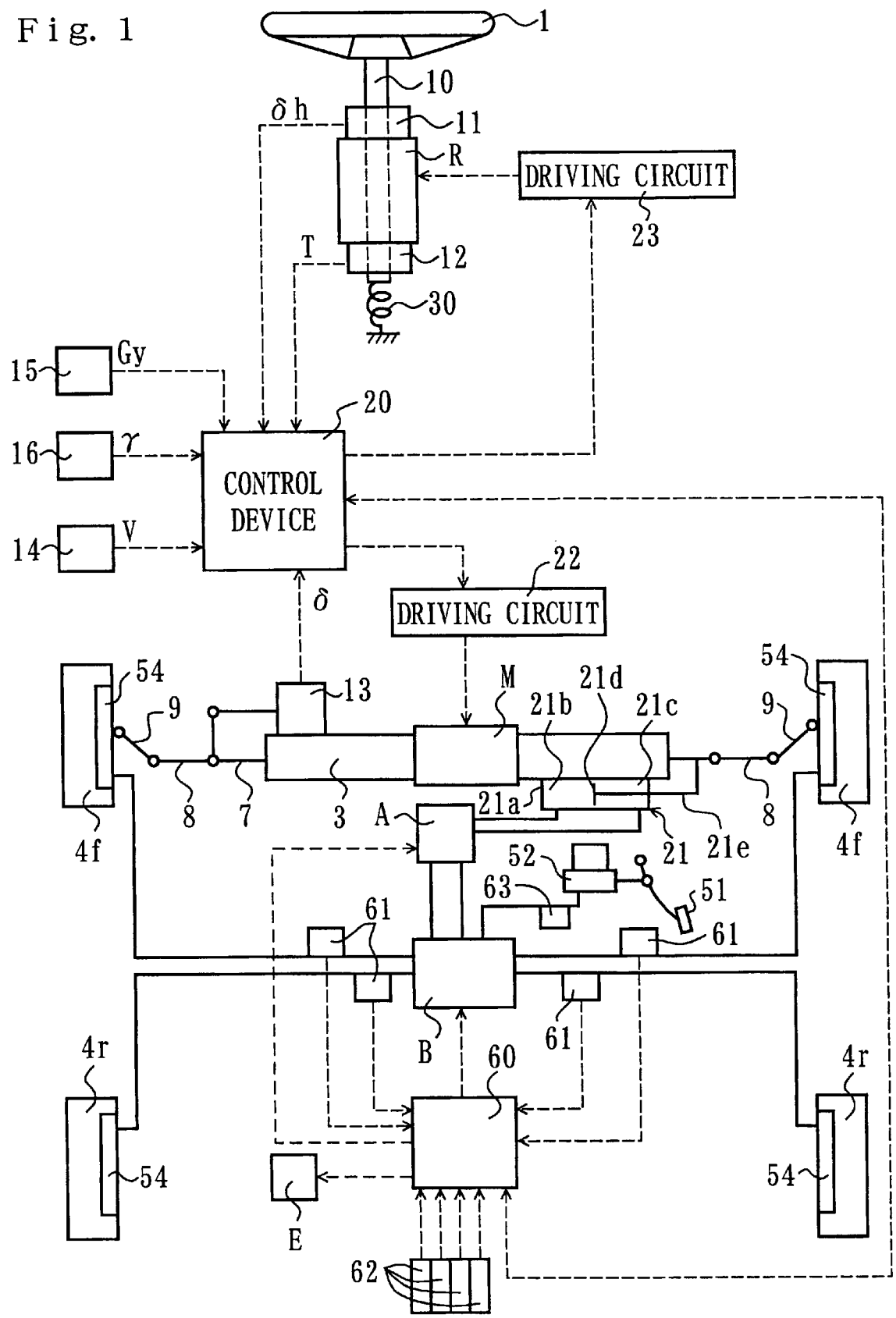
FIG. 1 is a figure explaining the configuration of the steering device of an embodiment of the present invention.

The steering device for vehicle shown in FIG. 1 transmits the movement of a steering electrical actuator M, which is driven according to the rotational operation of a steering wheel (operation member) 1, to the front left and right vehicle wheels 4f such that the steering angle is changed by the steering gear 3, without mechanical linkage of the steering wheel 1 with to the front left and right vehicle wheels 4f.

The steering electrical actuator M can be configured from, for example, a known brushless motor or other electric motor. The steering gear 3 has a motion conversion mechanism which converts the rotational motion of the output shaft of the steering electrical actuator M into linear motion of a steering rod 7. The movement of the steering rod 7 is transmitted to the vehicle wheels 4f via tie rods 8 and knuckle arms 9. A known steering gear can be used as the steering gear 3, and there are no limitations on the configuration so long as the steering angle is changed by the movement of the steering electrical actuator M; for example, the configuration can have a nut which is driven in rotation by the output shaft of the steering electrical actuator M, and a screw shaft formed integrally with the steering rod 7 and which screws with the nut. The wheel alignment is set such that, when the steering electrical actuator M is not driven, the vehicle wheels 4f are restored to the straight-ahead position by a self-aligning torque.

A double-acting hydraulic cylinder 21 is provided as the steering assistance force generation hydraulic actuator. That is, the hydraulic cylinder 21 has a cylinder tube 21a mounted on the casing of the steering gear 3; a piston 21d which partitions the interior of the cylinder tube 21a into a pair of chambers 21b, 21c; and a rod 21e which is formed integrally with the piston 21d. This rod 21e is linked with the steering rod 7.

The steering wheel 1 is linked with a rotating shaft 10 supported rotatably by the vehicle body. In order to generate the operation reaction force corresponding to force necessary to operate the steering wheel 1, a reaction force actuator R which adds a torque to the rotating shaft 10 is provided. This reaction force actuator R can be configured, for example, from a brushless motor or other electric motor having an output shaft integrated with the rotating shaft 10.

An elastic member 30 is provided which imparts an elastic force in a direction to restore the steering wheel 1 to the straight-ahead position. This elastic member 30 can, for example, is comprised of a helical spring which imparts an elastic force to the rotating shaft 10. When the above reaction force actuator R is not applying a torque to the rotating shaft 10, this elastic force causes the steering wheel 1 to be restored to the straight-ahead position.

An angle sensor 11 is provided which detects the steering angle corresponding to the rotation angle of the rotating shaft 10 as the amount of operation of the steering wheel 1. A torque sensor 12 is provided which detects the torque transmitted by the rotating shaft 10 as the operating torque of the steering wheel 1.

A steering angle sensor 13 is provided which detects the action amount of the steering rod 7 as the steering angle of the vehicle. This steering angle sensor 13 can be comprised of a potentiometer.

The angle sensor 11, torque sensor 12, and steering angle sensor 13 are connected to a steering system control device 20 comprised of a computer. This control device 20 is connected to a lateral acceleration sensor 15 which detects lateral acceleration of the vehicle, a yaw rate sensor 16 which detects the yaw rate of the vehicle, and a vehicle velocity sensor 14 which detects the vehicle velocity. The control device 20 controls the above steering electrical actuator M and reaction force actuator R via driving circuits 22, 23.

A brake system is provided for braking the right and left vehicle wheels 4f, 4r in the front and rear. This brake system causes the master cylinder 52 to generate a braking hydraulic pressure according to the depression force of the brake pedal 51. This braking hydraulic pressure is distributed to the brake devices 54 of each of the vehicle wheels 4f, 4r via a hydraulic pressure imparting unit A and a hydraulic pressure distribution unit B, so that each of the brake devices 54 applies a braking force to the respective vehicle wheels 4f, 4r.

The hydraulic pressure imparting unit A and hydraulic pressure distribution unit B are connected to a travel system control device 60 comprised of a computer. This travel system control device 60 is connected to the steering system control device 20, braking pressure sensors 61 which individually detect the hydraulic braking pressure at each of the vehicle wheels 4f, 4r, wheel velocity sensors 62 which individually detect the rotation velocities of each of the vehicle wheels 4f, 4r, and a braking pressure sensor 63 which detects the hydraulic braking pressure of the master cylinder 52. This travel system control device 60 controls the hydraulic pressure imparting unit A and hydraulic pressure distribution unit B such that hydraulic braking pressure is imparted and distributed according to feedback of the rotation velocities of each of the vehicle wheels detected by the wheel velocity sensors 62 and of the hydraulic braking pressure detected by the braking pressure sensors 61. By this means, the braking force can be controlled individually for each of the right and left vehicle wheels 4f, 4r in the front and rear. Further, the travel system control device 60 judges whether the vehicle is steered when the vehicle velocity is zero, that is, whether the vehicle is steered in a stationary state, based on the detection values of the angle sensor 11 and vehicle velocity sensor 14 sent via the steering system control device 20.

When the vehicle is not steered in the stationary state, the hydraulic pressure imparting unit A can generate not only the hydraulic braking pressure imparted as a result of depression of the brake pedal 51 but also hydraulic braking pressure by using an internal pump in response to hydraulic braking pressure command signals from the travel system control device 60 without depressing the brake pedal 51. When the vehicle is steered in the stationary state, the hydraulic pressure imparting unit A applies hydraulic pressure to the hydraulic cylinder 21. The hydraulic pressure distribution unit B distributes hydraulic braking pressure to the brake devices 54 of each of the vehicle wheels 4f, 4r, and in doing so can perform distribution such that the hydraulic braking pressure is different at each of the brake devices 54.

Figure 8:
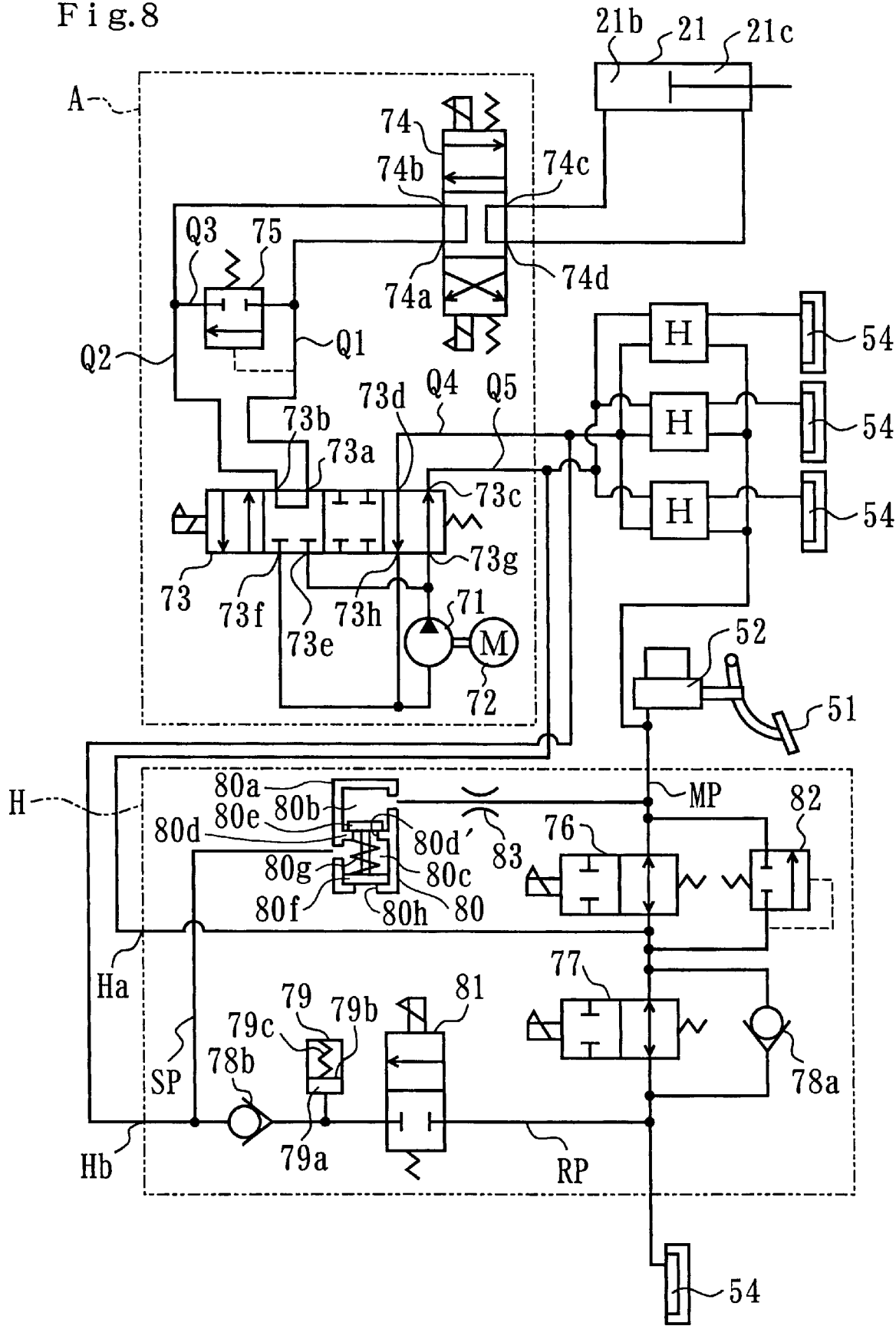

To be more precise, as shown in FIG. 8, the hydraulic pressure imparting unit A comprises a pump 71, pump driving electrical actuator 72, first electromagnetic switching valve 73, second electromagnetic switching valve 74, and relief valve 75. The hydraulic pressure distribution unit B comprises hydraulic circuits H corresponding to each of the brake devices 54 of the right and left wheels in the front and rear of the vehicle.

The first electromagnetic switching valve 73 in the hydraulic pressure imparting unit A has first through eighth ports 73a through 73h. The first electromagnetic switching valve 73 is switched in response to switching signals from the travel system control device 60 between a steering assistance state, in which the vehicle is steered in the stationary state, and a braking assistance state, in which the vehicle is not steered in the stationary state. The second electromagnetic switching valve 74 has first through fourth ports 74a through 74d, and is switched in response to switching signals from the travel system control device 60 corresponding to the steering direction between a neutral state, in which the vehicle is not steered, a right-steering state, in which the vehicle is steered to the right, and a left-steering state, in which the vehicle is steered to the left. In the first electromagnetic switching valve 73, the first port 73a is connected to the first port 74a of the second electromagnetic switching valve 74 by piping, the second port 73b is connected to the second port 74b of the second electromagnetic switching valve 74 by piping, the third port 73c is connected to the input port Ha of each of the hydraulic circuits H by piping, the fourth port 73d is connected to the output port Hb of each of the hydraulic circuits H by piping, the fifth and seventh ports 73e, 73g are connected to the exhaust side of the pump 71 by piping, and the sixth and eighth ports 73f, 73h are connected to the suction side of the pump 71 by piping.

In the second electromagnetic switching valve 74, the third port 74c is connected to one chamber 21b of the hydraulic cylinder 21 by piping, and the fourth port 74d is connected to the other chamber 21c of the hydraulic cylinder 21 by piping.

The relief valve 75 is provided midway in the pipe Q3 which connects the pair of pipes Q1, Q2 connecting the first electromagnetic switching valve 73 with the second electromagnetic switching valve 74.

Each of the hydraulic circuits H has a similar configuration, and in the figure, the hydraulic circuit H corresponding to one of the brake devices 54 for each vehicle wheel is shown. Each of the hydraulic circuits H comprises a normally-open first electromagnetic on-off valve 76, a normally-open second electromagnetic on-off valve 77, first and second check valves 78a, 78b, a buffer chamber 79, a negative-pressure operation valve 80, a normally-closed third electromagnetic on-off valve 81, and a relief valve 82.

The first electromagnetic on-off valve 76 is positioned midway in the main pipe MP which connects the master cylinder 52 with the brake device 54.

The second electromagnetic on-off valve 77 is positioned midway in the main pipe MP, in series with the first electromagnetic on-off valve 76, between the first electromagnetic on-off valve 76 and the brake device 54.

The first check valve 78a is positioned midway in the main pipe MP, in parallel with the second electromagnetic on-off valve 77, between the first electromagnetic on-off valve 76 and the brake device 54, and permits the flow of the hydraulic fluid from the brake device 54 to the first electromagnetic on-off valve 76.

Between the first electromagnetic on-off valve 76 and the second electromagnetic on-off valve 77, the main pipe MP is connected to the input port Ha of the hydraulic circuit H.

A relief valve 82 is positioned midway in the pipe, which connects a portion of the main pipe MP between the first electromagnetic on-off valve 76 and the second electromagnetic on-off valve 77 with a portion of the main pipe MP between the master cylinder 52 and the first electromagnetic on-off valve 76.

The output port Hb of the hydraulic circuit H is connected, via a return pipe RP, with a portion of the main pipe MP between the second electromagnetic on-off valve 77 and the brake device 54.

The third electromagnetic on-off valve 81 is positioned midway in the return pipe RP.

The second check valve 78b is positioned midway in the return pipe RP, in series with the third electromagnetic on-off valve 81, between the third electromagnetic on-off valve 81 and the output port Hb, and permits the flow of the hydraulic fluid from the third electromagnetic on-off valve 81 to the suction side of the pump 71.

The buffer chamber 79 is connected with a portion of the return pipe RP between the third electromagnetic on-off valve 81 and the second check valve 78b. The buffer chamber 79 has an oil reservoir chamber 79a connected to the return pipe RP; a piston 79b positioned within the oil reservoir chamber 79a; and a spring 79c which imparts elastic force to the piston 79b in the direction to decrease the capacity of the oil reservoir chamber 79a.

A portion of the return pipe RP between the second check valve 78b and the output port Hb is connected to a portion of the main pipe MP between the master cylinder 52 and the first electromagnetic on-off valve 76 via a suction pipe SP.

The negative-pressure operation valve 80 is positioned midway in the suction pipe SP. A throttle portion 83 is provided in the suction pipe SP between the negative-pressure operation valve 80 and the main pipe MP.

The negative-pressure operation valve 80 has a cylinder 80a; a partitioning wall 80d which partitions the interior of the cylinder 80a into a first chamber 80b and a second chamber 80c; an open/close member 80e which can move in directions to open and close an aperture 80d' formed in the wall 80d within the first chamber 80b; a piston 80f which is linked with the open/close member 80e so as to move together, and the movement of which causes the capacity of the second chamber 80c to change; and a spring 80g which imparts an elastic force causing the piston 80f to move in the direction to increase the capacity of the second chamber 80c, and which causes the open/close member 80e to move in the direction to close the aperture 80d'. The hydraulic pressure in the second chamber 80c acts on one end of the piston 80f, and atmospheric pressure acts on the other end of the piston 80f via an aperture 80h formed in the cylinder 80a.

The first electromagnetic switching valve 73 in the hydraulic pressure imparting unit A is put into the steering-assist state by a signal from the travel system control device 60 which has judged that the vehicle is steered in a stationary state, in which it connects the exhaust side of the pump 71 to the first port 74a of the second electromagnetic switching valve 74, connects the suction side of the pump 71 to the second port 74b of the second electromagnetic switching valve 74, and connects the pipes Q4, Q5, which connect the first electromagnetic switching valve 73 with the hydraulic pressure distribution unit B, to each other.

The first electromagnetic switching valve 73 is put into the braking-assist state by a signal from the travel system control device 60 which has judged that the vehicle is not steered in a stationary state, in which it connects the exhaust side of the pump 71 to the input port Ha of each of the hydraulic circuits H, connects the suction side of the pump 71 to the output port Hb of each of the hydraulic circuits H, and connects the pipes Q1, Q2, which connect the first electromagnetic switching valve 73 with the second electromagnetic switching valve 74, to each other.

That is, the first electromagnetic switching valve 73 switches the supply route of the hydraulic fluid in response to the judgment result from the travel system control device 60 such that the hydraulic fluid can be supplied to the hydraulic cylinder 21 from the pump 71 when the vehicle is steered in the stationary state, and the hydraulic fluid can be supplied from the pump 71 to the brake devices 54 when the vehicle is not steered in the stationary state.

As shown in FIG. 1, the travel system control device 60 is connected to the throttle valve driving actuator E of the engine which generates traveling motive force for the vehicle. This actuator E is driven by signals from the travel system control device 60 to change the opening of the throttle valve, enabling control of the engine output.

Figure 2:
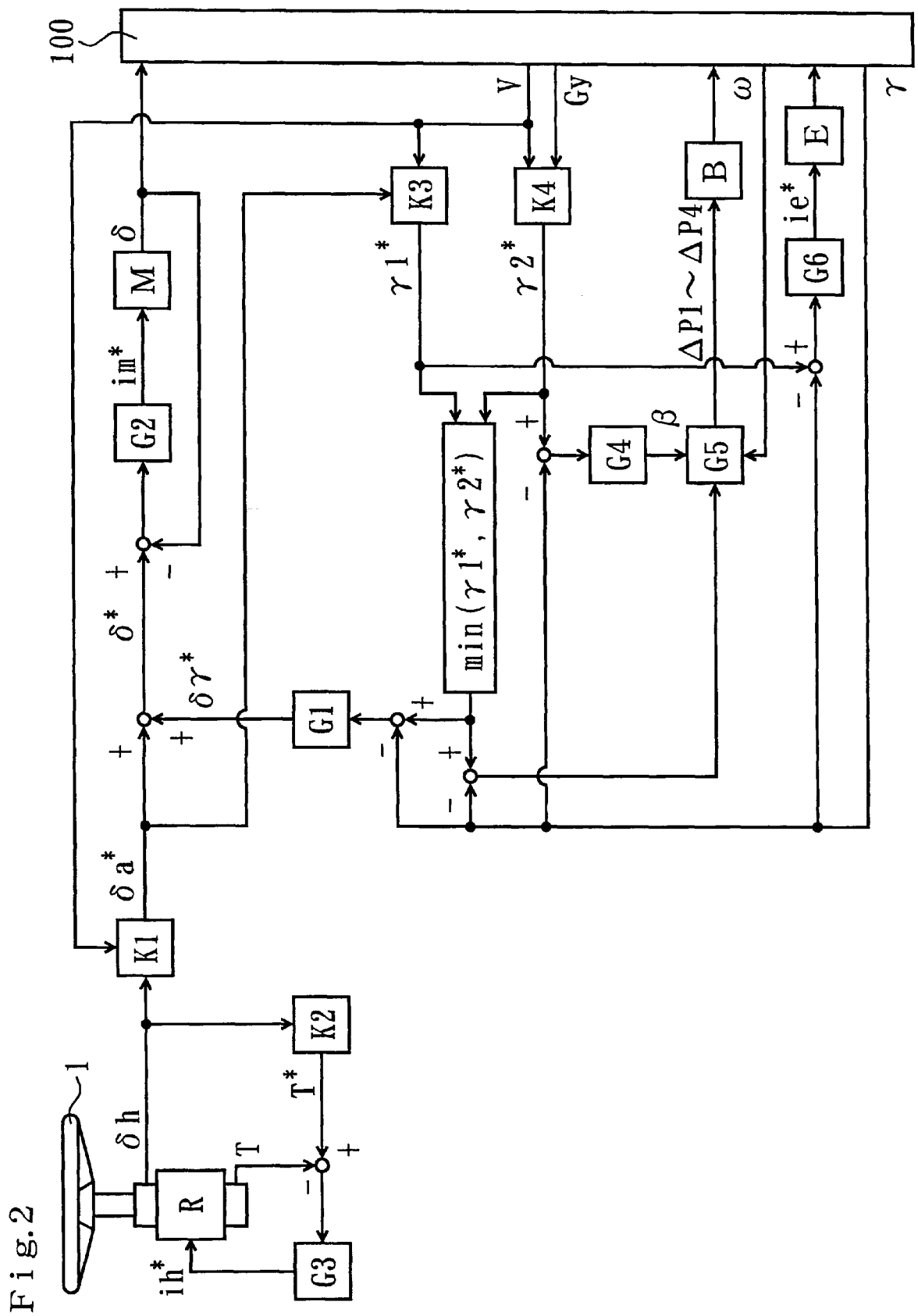
FIG. 2 is a block diagram of control of the steering device of an embodiment of the present invention.

FIG. 2 shows a control block diagram of the above steering device. Symbols in this control block diagram are as follows.

δh: Operation angle

δ: Steering angle

δ*: Target steering angle

δa*: First steering angle set value

δγ*: Second steering angle set value

β: Lateral slip angle of vehicle 100

T: Operating torque

T*: Target operating torque

γ: Yaw rate

γ1*: First target yaw rate

γ2*: Second target yaw rate

Gy: Lateral acceleration

Figure 3:
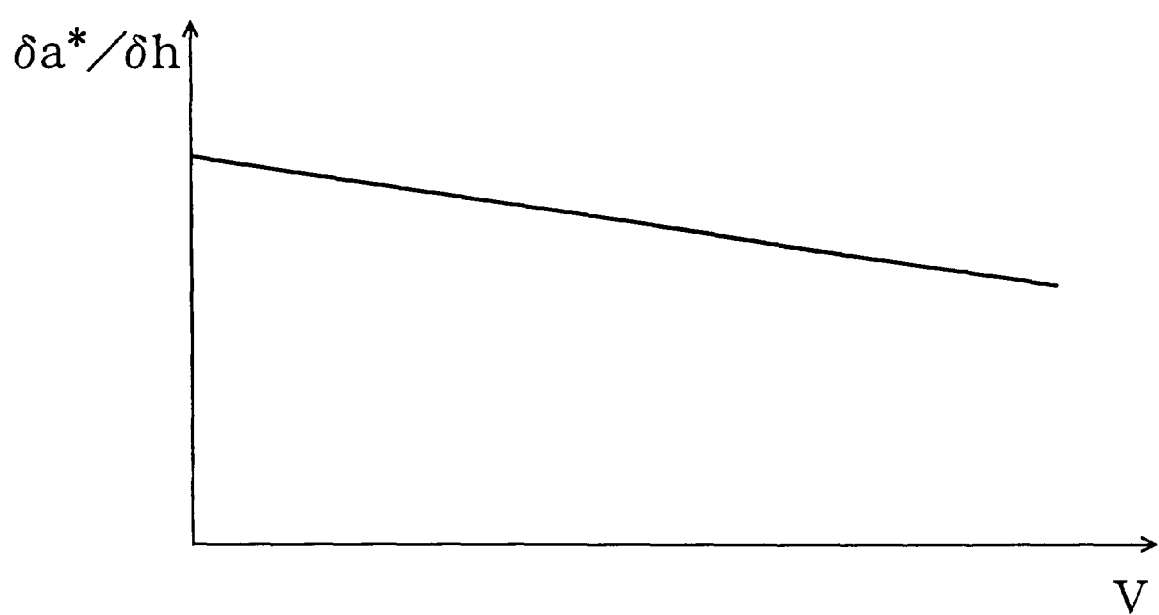
FIG. 3 is a figure showing the relation between the gain of a first steering angle setting with respect to the steering angle, and the vehicle speed.

V: Vehicle velocity

ω: Wheel velocity im*: Target driving current of the steering electrical actuator M ie*: Target driving current of the throttle valve driving actuator E ih*: Target driving current of the reaction force actuator R ΔP1, ΔP2, ΔP3, ΔP4: Command values of the braking hydraulic pressures K1 is the gain of the first steering angle set value δa* with respect to the operation angle δh. The first steering angle set value δa* is calculated from the relation of δa*=K1·δh and the detected operation angle δh. This K1 is a function of the vehicle velocity V, and, for example, is decreased as the vehicle velocity increases as shown in FIG. 3, such that the ratio of the yaw rate of the vehicle 100 to the operation angle δh is substantially constant regardless of change of the vehicle velocity. That is, the control device 20 stores the gain K1 representing a predetermined relation between the operation angle δh, the vehicle velocity V, and the first steering angle set value δa*, and calculates the first steering angle set value δa* from the detected operation angle δh and the vehicle velocity V based on this relation.

K2 is the gain of the target operating torque T* with respect to the operation angle δh; the target operating torque T* is computed from the relation of T*=K2·δh and the detected operation angle δh. That is, the control device 20 stores the gain K2 representing a predetermined relation between the target operating torque T* and the operation angle δh, and calculates the target operating torque T* based on this relation and the detected operation angle δh. K2 is adjusted so as to perform optimal control. The operating torque T can be used in place of the operation angle δh, with storing the predetermined relation between the target operating torque T* and the operating torque T, and the target operating torque T* can be calculated from this relation and the operating torque T.

K3 is the gain of the first target yaw rate γ1* with respect to the first steering angle set value δa*. The first target yaw rate γ1* is calculated from the relation of γ1*=K3δa* and the first steering angle set value δa* calculated above. In this embodiment, K3 is taken to be the steady gain of the yaw rate with respect to the steering angle, so that K3=V/{(1+SF·V$^2$)L}. Here SF is a stability factor and L is the wheel base, both are values specific to the vehicle 100. That is, the control device 20 stores the gain K3 representing a predetermined relation between the first steering angle set value δa*, the first target yaw rate γ1*, and the vehicle velocity V, and calculates the first target yaw rate γ1* from the calculated first steering angle set value δa* and the detected vehicle velocity V based on this relation.

Figure 4:
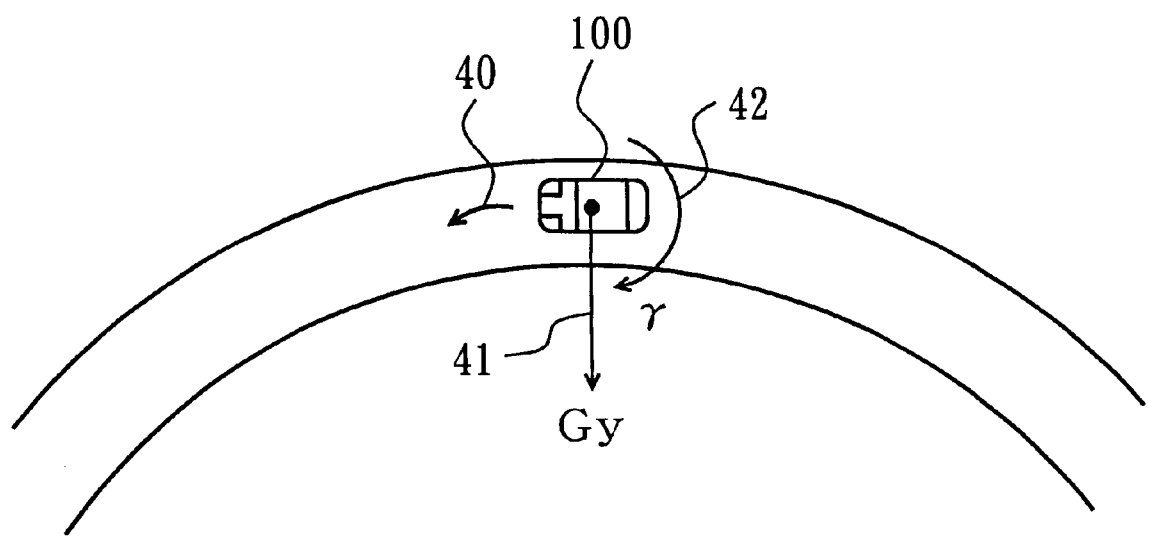
FIG. 4 is a figure showing the vehicle state in steady-state circular turning.

K4 is the gain of the second target yaw rate γ2* with respect to the lateral acceleration Gy. The second target yaw rate γ2* is calculated from the relation of γ2*=K4·Gy and the detected lateral acceleration Gy. In FIG. 4, if a vehicle 100, which turns at velocity V in the direction indicated by the arrow 40, is regarded as being in a steady turning state, the relation between the lateral acceleration Gy acting in the direction shown by the arrow 41 on the vehicle 100 and the yaw rate γ acting in the direction indicated by the arrow 42 is γ=Gy/V, hence in this embodiment, K4=1/V. That is, the control device 20 stores the gain K4 which represents the predetermined relation between the second target yaw rate γ2*, the lateral acceleration Gy, and the vehicle velocity V, and calculates the second target yaw rate γ2* from the detected lateral acceleration Gy and the vehicle velocity V based on this relation.

The control device 20 compares the absolute value of the calculated first target yaw rate γ1* and the absolute value of the calculated second target yaw rate γ2*, and calculates the deviation between the detected yaw rate γ and the target yaw rate min(γ1*, γ2*), the absolute value of which is the smaller of the absolute values of the first target yaw rate γ1* and the second target yaw rate γ2*.

G1 is a transfer function of the second steering angle set value δγ* with respect to the deviation between the min(γ1*, γ2*) and the yaw rate γ, and thus the second steering angle set value δγ* is determined from the relation of δγy*= G1·{min(γ1*, γ2*)−γ} and the calculated deviation {min(γ1*, γ2*)−γ}. When for example PI (Proportional Integral) control is executed, if the gain is Ka, the Laplace operator is s, and the time constant is Ta, then this transfer function G1 is expressed as G1=Ka[1+1/(Ta·s)]. The gain Ka and time constant Ta are adjusted so that optimal control can be executed. That is, the control device 20 stores the transfer function G1 representing a predetermined relation between the deviation {min(γ1*, γ2*)−γ} and the second steering angle set value δγ*. Again, the control device 20 calculates the second steering angle set value δγ* based on this relation according to the calculated deviation {min(γ1*, γ2*)−γ}.

G2 is a transfer function of the target driving current im* of the steering electrical actuator M with respect to the deviation obtained by subtracting the detected steering angle δ from the target steering angle δ*, which is the sum of the calculated first steering angle set value δa* and the calculated second steering angle set value δγ*. That is, the target driving current im* is calculated from the relation of im*= G2·(δa*+δγ*−δ), the calculated first steering angle set value δa*, the calculated second steering angle set value δγ*, and the detected steering angle δ. When for example PI control is executed, if the gain is Kb, the Laplace operator is s and the time constant is Tb, then this transfer function G2 is expressed as G2=Kb[1+1/(Tb·s)]. The gain Kb and time constant Tb are adjusted so as to enable optimal control. That is, the control device 20 stores the transfer function G2 representing the predetermined relation between the target driving current im* and the deviation obtained by subtracting the detected steering angle δ from the target steering angle δ*, which is the sum of the first steering angle set value δa* and the second steering angle set value δγ*. Again, the control device 20 calculates the target driving current im* based on this relation according to the calculated first steering angle set value δa*, the calculated second steering angle set value δγ* and the detected steering angle δ. The steering electrical actuator M is then driven according to the target driving current im*. By this means, the steering electrical actuator M is controlled so that the steering angle δ corresponds to the target steering angle δ*.

G3 is a transfer function of the target driving current ih* of the reaction force actuator R with respect to the deviation obtained by subtracting the detected operating torque T from the calculated target operating torque T*. That is, the target driving current ih* is calculated from the relation of ih*=

G3·(T*−T), the calculated target operating torque T*, and the detected operating torque T. When for example PI control is executed, if the gain is Kc, the Laplace operator is s and the time constant is Tc, then the transfer function G3 is expressed as G3=Kc[1+1/(Tc·s)]. The gain Kc and time constant Tc are adjusted so as to enable optimal control. That is, the control device 20 stores the transfer function G3 representing the predetermined relation between the target driving current ih* and the deviation obtained by subtracting the detected operating torque T from the target operating torque T*. Again, the control device 20 calculates the target driving current ih* based on this relation according to the calculated target operating torque T* and the detected operating torque T. The reaction force actuator R is then driven according to this target driving current ih*.

G4 is a transfer function of the lateral slip angle β of the vehicle with respect to the deviation obtained by subtracting the detected yaw rate γ from the calculated second target yaw rate γ2*. That is, the lateral slip angle β is determined from the relation of β=G4·(γ2*−γ), the calculated second target yaw rate γ2* and the detected yaw rate γ. In the cases of a vehicle 100 which has slipped laterally in the oversteered state as in FIG. 5(1), and in the case of a vehicle 100 which has slipped laterally in the understeered state as in FIG. 5(2), if the angle made by the vehicle center line along the longitudinal direction of the vehicle 100 indicated by the dot-dash line and the direction of motion of the vehicle 100 when there is no slipping indicated by the dashed line is the lateral slip angle β, then the lateral slip angle β can be determined approximately from the time-integrated value of (Gy/V−γ), that is, from β=∫(Gy/V−γ)dt. As explained above, γ2*=K4·Gy=Gy/V, so that (γ2*−γ) is the differential dβ/dt of the lateral slip angle β. Hence in this embodiment, if the Laplace operator is s, G4 is expressed as G4=1/s so that the integral of (γ2*−γ) becomes equal to the lateral slip angle β. In other words, the control device 20 stores the transfer function G4 representing the predetermined relation between the lateral slip angle β and the deviation obtained by subtracting the detected yaw rate γ from the second target yaw rate γ2*. Again, the control device 20 calculates the lateral slip angle β based on this relation according to the calculated second target yaw rate γ2* and the detected yaw rate γ.

G5 is a transfer function of the command values of the braking hydraulic pressures ΔP1, ΔP2, ΔP3, ΔP4 for the front and rear left and right vehicle wheels 4f, 4r with respect to the deviation between the calculated quantity min(γ1*, γ2*) and the detected yaw rate γ. Each of the command values of the braking hydraulic pressures ΔP1, ΔP2, ΔP3, ΔP4 is deviation from the braking hydraulic pressure detected by each of the braking hydraulic sensors 61. The relative ratio of each of the command values of the braking hydraulic pressures ΔP1, ΔP2, ΔP3, ΔP4 is determined as a prescribed value from the steering state and turning direction. Here the steering state, that is, whether the vehicle is in an oversteering state or an understeering state is judged from the quantity min(γ1*, γ2*) and the detected yaw rate γ. With setting ΔP1+ΔP2+ΔP3+ΔP4=ΔP. The command values of the braking hydraulic pressures ΔP1, ΔP2, ΔP3, ΔP4 are determined based on the relation of ΔP=G5·{min(γ1*,γ2*)−γ} from the calculated min(γ1*, γ2*), the detected yaw rate γ, the ratio of the braking hydraulic pressure and the above prescribed value of the relative ratio. The transfer function G5 can be determined similarly to the prior case wherein the vehicle braking hydraulic pressure is controlled so that the deviation between the target yaw rate and detected yaw rate is eliminated. In other words, the control device 60 stores the transfer function G5 representing the predetermined relation between the quantity {min(γ1*, γ2*)−γ}, the command values of the braking hydraulic pressures ΔP1, ΔP2, ΔP3, ΔP4, and the braking hydraulic pressures, and calculates the command values of the braking hydraulic pressures ΔP1, ΔP2, ΔP3, ΔP4 based on this relation according to the calculated min(γ1*, γ2*), the detected yaw rate γ, and the braking hydraulic pressures. By applying the braking hydraulic pressure command signals according to the command values of the braking hydraulic pressures ΔP1, ΔP2, ΔP3, ΔP4, the hydraulic pressure imparting unit A generates braking hydraulic pressure, and the hydraulic pressure distribution unit B distributes the braking hydraulic pressure to each of the brake devices 54. By this means, the braking forces for the front and rear left and right vehicle wheels 4f, 4r are controlled such that the deviation between the target yaw rate, the absolute value of which is the smaller of the absolute values of the first target yaw rate γ1* and the second target yaw rate γ2*, and the yaw rate γ is canceled.

G6 is a transfer function of the target driving current ie* of the throttle valve driving actuator E with respect to the deviation between the detected yaw rate γ and the calculated first target yaw rate γ1*. That is, the target driving current ie* is determined from the relation of ie*=G6·(γ1*−γ), the calculated first target yaw rate γ1*, and the detected yaw rate γ. When for example PI control is executed, if Ke is the gain, s is the Laplace operator and Te is the time constant, then this transfer function G6 is expressed as G6=Ke[1+1/(Te·s)]. The gain Ke and time constant Te are adjusted so as to enable optimal control. That is, the control device 60 stores the transfer function G6 representing the predetermined relation between the deviation (γ1*−γ) and the target driving current ie*, and based on this relation, calculates the target driving current ie* according to the deviation between the calculated first target yaw rate γ1* and the detected yaw rate γ. The throttle valve driving actuator E is driven by signals according to the target driving current ie*. By this means, the output of the engine generating traveling motive force for the vehicle 100 is controlled such that the deviation between the first target yaw rate γ1* and the yaw rate γ is canceled.

Figure 6:
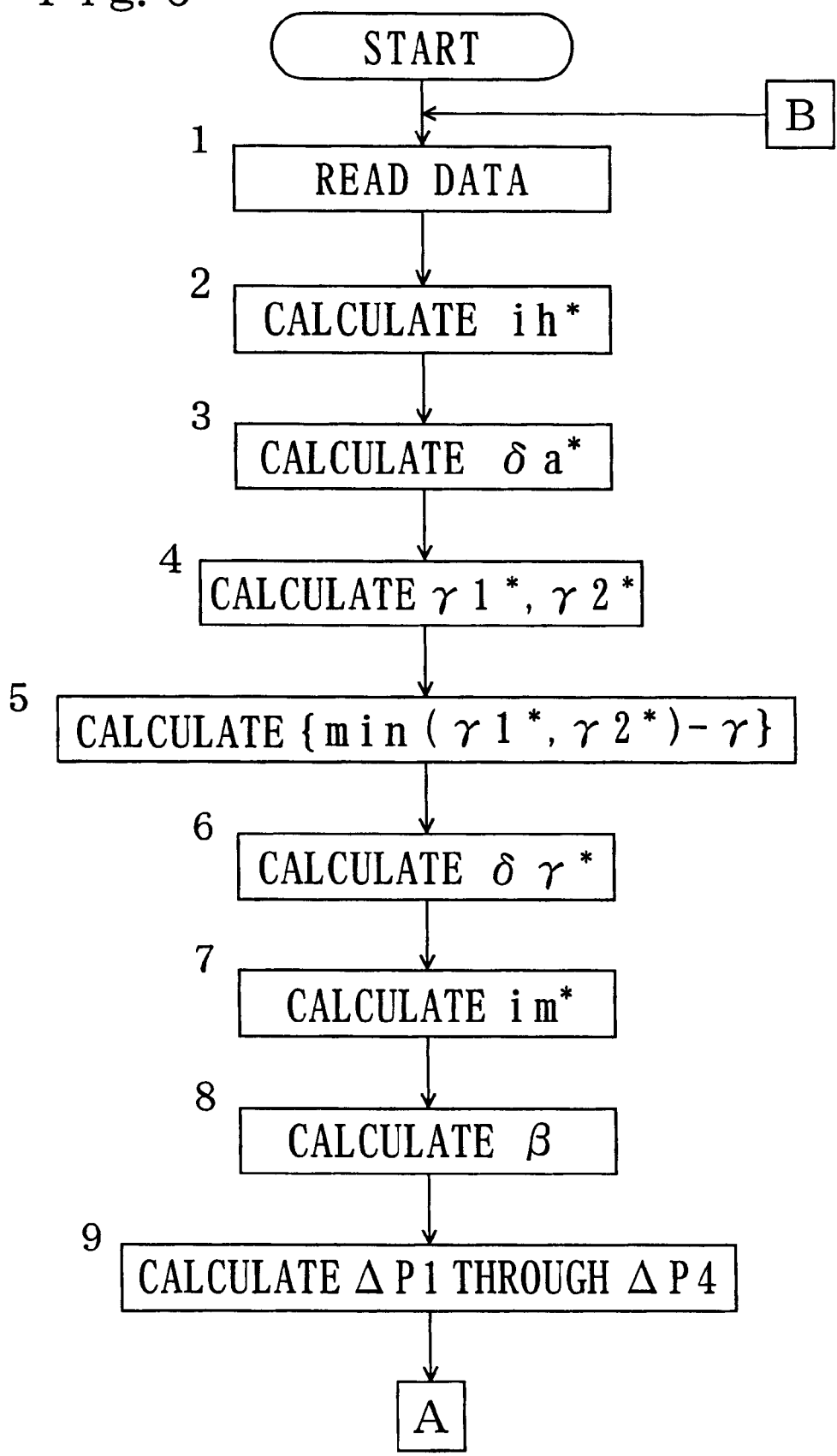
FIG. 6 is a flowchart showing the control procedure of the steering device of the embodiment of the present invention.
Figure 7:
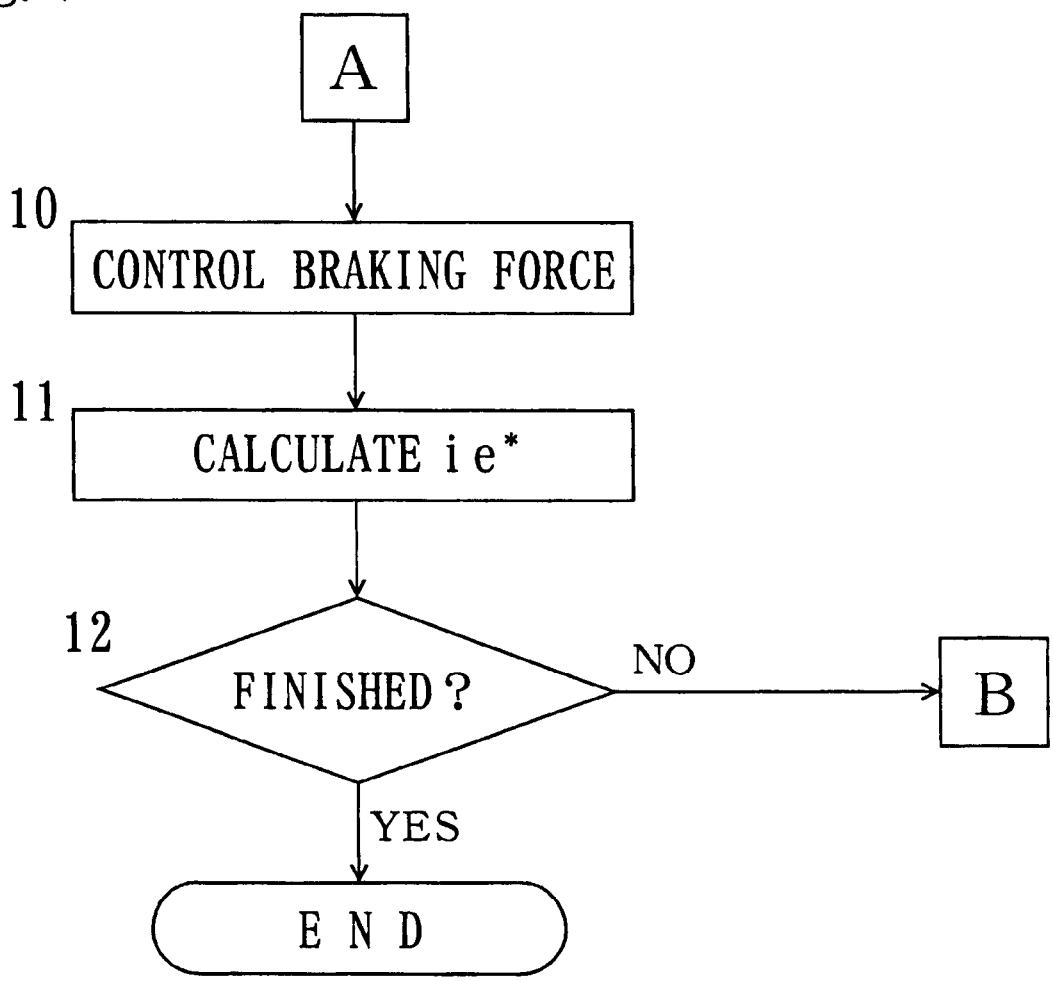
FIG. 7 is a flowchart showing the control procedure of the steering device of the embodiment of the present invention; and, FIG. 8 is a figure showing the hydraulic circuit of the steering device of the embodiment of the present invention.

The procedure for attitude control of the above steering device is explained below, referring to the flowcharts of FIG. 6 and FIG. 7.

First, values detected by each of the sensors 11 through 16, 61, 62, and 63 for the operation angle δh, operating torque T, steering angle δ, vehicle velocity V, lateral acceleration Gy, yaw rate y, braking hydraulic pressures, wheel velocity ω, and master cylinder braking hydraulic pressure are read in (step 1). Next, the target driving current ih* for the reaction force actuator R is calculated based on the transfer function G3 such that the deviation obtained by subtracting the operating torque T from the target operating torque T*, which is determined based on the gain K2 according to the operation angle δh, becomes zero (step 2). The reaction force actuator R is driven by being applied this target driving current ih*. Then, the first steering angle set value δa* is calculated based on the gain K1 according to the operation angle δh and the vehicle velocity V (step 3). The first target yaw rate γ1* is calculated based on the gain K3 according to the first steering angle set value δa* and the vehicle velocity V. The second target yaw rate γ2* is also calculated based on the gain K4 according to the lateral acceleration Gy and vehicle velocity V (step 4). The absolute value of the first target yaw rate γ1* and the absolute value of the second target yaw rate γ2* are compared, and the deviation of the yaw rate γ from the target yaw rate min(γ1*, γ2*), the absolute value of which is smaller of the absolute values of the two target yaw rates, is calculated (step 5). The second steering angle set value δγ* is calculated according to this deviation and the transfer function G1 (step 6). Then, the target driving current im* for the steering electrical actuator M is calculated based on the transfer function G2 such that the deviation obtained by subtracting the steering angle δ from the target steering angle δ*, which is obtained by taking the sum of the first steering angle set value δa* and the second steering angle set value δγ*, becomes zero (step 7). By being applied this target driving current im*, the steering electrical actuator M is driven so that the steering angle changes. Next, the lateral slip angle β is calculated based on the transfer function G4 according to the deviation obtained by subtracting the yaw rate γ from the second target yaw rate γ2* (step 8). The command values of the braking hydraulic pressures ΔP1, ΔP2, ΔP3, ΔP4 are then calculated based on the transfer function G5 according to the deviation between the above min(γ1*, γ2*) and the yaw rate γ, the wheel velocity ω, and the braking hydraulic pressures (step 9). By being applied the braking hydraulic pressure command signals according to the command values of the braking hydraulic pressures ΔP1, ΔP2, ΔP3, ΔP4, the hydraulic pressure imparting unit A and hydraulic pressure distribution unit B control the braking force such that the vehicle behavior is stabilized through changes in the braking force (step 10). Next, the target driving current ie* of the throttle valve driving actuator E is calculated based on the transfer function G6 according to the deviation obtained by subtracting the yaw rate γ from the first target yaw rate γ1* (step 11). By being applied this target driving current ie*, the throttle valve driving actuator E changes the opening amount of the throttle valve such that the vehicle behavior is stabilized by changes in the engine output. Then, a judgment as to whether or not control is finished is made (step 12). If control is not finished, execution returns to step 1. This judgment can be performed by, for example, determining whether the starting key switch for the vehicle is turned on or not.

According to the above attitude control, if the yaw rate γ does not change due to a reduction of the friction coefficient between the road surface and the vehicle wheels 4f, 4r in spite of the operation of the steering wheel 1, the absolute value of the first target yaw rate γ1*, which corresponds to the operation angle δh and vehicle velocity V, is larger than the absolute value of the second target yaw rate γ2*, which corresponds to the detected lateral acceleration Gy and vehicle velocity V. In this case, the second steering angle set value δγ* is calculated according to the deviation of the detected yaw rate γ from the second target yaw rate γ2*, the absolute value of which is smaller than the absolute value of the first target yaw rate γ1*. That is, the second steering angle set value δγ* reflects the actual vehicle behavior. Hence by setting the sum of the second steering angle set value δγ* and the first steering angle set value δa*, which corresponds to the detected operation angle δh and vehicle velocity V, equal to the target steering angle δ*, divergence of the steering angle can be prevented and the vehicle behavior can be stabilized.

If there is no such reduction in the friction coefficient between the road surface and the vehicle wheels 4f, 4r, and the absolute value of the first target yaw rate γ1* becomes smaller than the absolute value of the second target yaw rate γ2*, then the second steering angle set value δγ* is calculated according to the deviation between the first target yaw rate γ1* and the detected yaw rate γ, and thus reflects the operation angle δh and vehicle velocity V. Hence by setting the sum of the second steering angle set value δγ* and the first steering angle set value δa*, which corresponds to the detected operation angle δh and vehicle velocity V, equal to the target steering angle δ*, the vehicle behavior can be changed optimally according to the operation angle δh and vehicle velocity V.

The steering angle and vehicle braking force are respectively controlled such that the deviation between the target yaw rate, the absolute value of which is smaller of the absolute values of the first target yaw rate γ1* and second target yaw rate γ2*, and the detected yaw rate γ is canceled, and therefore mutual interference of the respective controls can be prevented.

In cases where reduction of the friction coefficient between the road surface and the vehicle wheels 4f, 4r tends to cause vehicle behavior to become unstable, the absolute value of the first target yaw rate γ1* becomes larger than that of the second target yaw rate γ2*, so that the absolute value of the deviation between the first target yaw rate γ1* and the detected yaw rate γ becomes larger than the absolute value of the deviation between the second target yaw rate γ2* and the detected yaw rate γ. By driving the throttle valve driving actuator E to control engine output such that this large deviation is canceled, the amount of suppression of the engine output increases. As a result, when the friction coefficient between the road surface and the vehicle wheels 4f, 4r decreases, the amount of suppression of the engine output can be increased to stabilize the vehicle behavior.

In the above constitution, when the first electromagnetic switching valve 73 is in the steering assistance state to steer the vehicle in the stationary state, the travel system control device 60 judges whether the steering electrical actuator M is being driven by application of the target driving current im*. If the steering electrical actuator M is being driven, the travel system control device 60 judges whether the vehicle is in the right-steering state or left-steering state, for example according to the sign of the target driving current im*, and then puts the second electromagnetic switching valve 74 into the right-steering state or left-steering state according to this judgment. Then, the travel system control device 60 drives the pump driving electrical actuator 72. By this means the pump 71 is driven, and thus a steering assistance force is imparted by hydraulic pressure acting on the hydraulic cylinder 21 via the second electromagnetic switching valve 74. In this way, when the vehicle is steered in the stationary state in which a large steering force is required, the hydraulic pressure for braking can be diverted to assist steering, so that the steering electrical actuator M can be made smaller and lightweight, and the energy efficiency of the vehicle can be improved without complicating the construction. When the vehicle is not steered in the stationary state, the travel system control device 60 puts the second electromagnetic switching valve 74 into a neutral state.

In the above constitution, when the vehicle is steered in the stationary state, or when the vehicle is not steered in the stationary state and the pump driving electrical actuator 72 is halted not to impart hydraulic pressure by the hydraulic pressure imparting unit A, if the driver depresses the brake pedal 51, the braking hydraulic pressure generated by the master cylinder 52 in response to this depressing force acts on the brake devices 54 via the first electromagnetic on-off valve 76 and the second electromagnetic on-off valve 77.

When the vehicle is not steered in the stationary state and hydraulic pressure is imparted by the hydraulic pressure imparting unit A, the travel system control device 60 puts the first electromagnetic switching valve 73 into the braking assistance state and controls the hydraulic pressure distribution unit B so as to impart hydraulic pressure according to the command values of the braking hydraulic pressures ΔP1, ΔP2, ΔP3, ΔP4. The travel system control device 60 judges whether the driver is depressing the brake pedal 51 based on the output from the braking pressure sensor 63.

If the hydraulic pressure imparting unit A is imparting hydraulic pressure when the driver is not depressing the brake pedal 51, the travel system control device 60 closes the first electromagnetic on-off valve 76, and drives the pump driving electrical actuator 72. By this means, the second chamber 80*c* of the negative-pressure operation valve 80 goes to negative pressure, and as a result of movement of the piston 80*f* and open/close member 80*e*, the first chamber 80*b* and second chamber 80*c* communicate with each other, the hydraulic fluid is sucked by the pump from the second chamber 80*c* and sent to the brake devices 54, so that braking hydraulic pressure is imparted to the brake devices 54.

When the braking hydraulic pressure reaches the prescribed pressure according to the command values of the braking hydraulic pressures ΔP1, ΔP2, ΔP3, ΔP4 in one or some of the brake devices 54, the travel system control device 60 closes the second electromagnetic on-off valve 77 in the hydraulic circuit H corresponding to the one or some of the brake devices 54. When ΔP1, ΔP2, ΔP3, ΔP4 become substantially zero, the travel system control device 60 halts the pump driving electrical actuator 72, and the first and second electromagnetic on-off valves 76, 77 are opened and the third electromagnetic on-off valve 81 is closed in all the hydraulic circuits H.

The present invention is not limited to the above embodiment. For example, the procedure for attitude control is not limited to that of the above embodiment; in addition, the present invention can be applied to vehicles which do not perform attitude control, and to vehicles in which an operation member is mechanically linked to the vehicle wheels and a steering electrical actuator for steering assistance is used.

What is claimed is:

1. A steering device for a vehicle having vehicle wheels, comprising:

a steering electrical actuator;

means for transmitting movement of the steering electrical actuator to the vehicle wheels such that steering angle changes according to the movement;

a pump to supply hydraulic fluid;

a brake device;

a steering assistance force generation hydraulic actuator;

means for judging whether the vehicle is steered in a stationary state and producing a judgment result; and means for switching a supply route of the hydraulic fluid in response to the judgment result such that, the hydraulic fluid is supplied to the steering assistance force generation hydraulic actuator from the pump when the vehicle is steered in the stationary state, and the hydraulic fluid is supplied to the brake device from the pump when the vehicle is not steered in the stationary state.

2. The steering device for vehicle according to claim 1, wherein the movement of the steering electrical actuator is transmitted to the vehicle wheels without mechanical linkage of an operating member, for manual operation by a user to effect steering, with the vehicle wheels.

3. The steering device for vehicle according to claim 1, wherein the means for transmitting of the movement of the steering electrical actuator to the vehicle wheels is comprised of a steering gear, the means for switching the supply route of the hydraulic fluid is comprised of an electromagnetic switching valve, and the means for judging whether the vehicle is steered in the stationary state is comprised of a computer.

* * * * *

UNITED STATES PATENT AND TRADEMARK OFFICE
CERTIFICATE OF CORRECTION

PATENT NO.     : 6,698,542 B2
DATED          : March 2, 2004
INVENTOR(S)    : Katsutoshi Nishizaki et al.

It is certified that error appears in the above-identified patent and that said Letters Patent is hereby corrected as shown below:

<u>Title page,</u>
Item [73], Assignees, should read

-- [73]  Assignees:  Koyo Seiko., Ltd., Osaka (JP)
                           Sumitomo (SEI) Brake Systems, Inc.,
                           Mie-pref (JP) --

Signed and Sealed this

Fifteenth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,698,542 B2
DATED : March 2, 2004
INVENTOR(S) : Katsutoshi Nishizaki et al.

It is certified that error appears in the above-identified patent and that said Letters Patent is hereby corrected as shown below:

<u>Title page,</u>
Item [73], Assignee, should read -- Koyo Sieko Co., Ltd., Osaka (JP)
Sumitomo (SEI) Brake Systems, Inc.,
Mei-pref (JP) --

Signed and Sealed this

Twenty-eighth Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,698,542 B2
DATED : March 2, 2004
INVENTOR(S) : Katsutoshi Nishizaki et al.

It is certified that error appears in the above-identified patent and that said Letters Patent is hereby corrected as shown below:

Title page,
Item [73], Assignee, should read -- Koyo Seiko Co., Ltd., Osaka (JP)
Sumitomo (SEI) Brake Systems, Inc.,
Mei-pref (JP) --

This certificate supersedes Certificate of Correction issued June 15, 2004 and September 28, 2004.

Signed and Sealed this

Twenty-fifth Day of January, 2005

JON W. DUDAS
*Director of the United States Patent and Trademark Office*

UNITED STATES PATENT AND TRADEMARK OFFICE
CERTIFICATE OF CORRECTION

PATENT NO.     : 6,698,542 B2
DATED          : March 2, 2004
INVENTOR(S)    : Katsutoshi Nishizaki et al.

Page 1 of 1

It is certified that error appears in the above-identified patent and that said Letters Patent is hereby corrected as shown below:

<u>Title page,</u>
Item [73], Assignee, should read -- Koyo Seiko Co., Ltd., Osaka (JP)
                                                        Sumtiomo (SEI) Brake Systems, Inc.,
                                                        Mie-pref (JP) --

This cerificate supersedes Certificate of Correction iussed June 15, 2004, September 28, 2004 and January 25, 2005.

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,698,542 B2
DATED : March 2, 2004
INVENTOR(S) : Katsutoshi Nishizaki et al.

It is certified that error appears in the above-identified patent and that said Letters Patent is hereby corrected as shown below:

<u>Title page,</u>
Item [73], Assignee, should read -- Koyo Seiko Co., Ltd., Osaka (JP)
Sumitomo (SEI) Brake Systems, Inc.,
Mie-pref (JP) --

This cerificate supersedes Certificate of Correction iussed June 15, 2004, September 28, 2004, January 25, 2005 and May 10, 2005.

Signed and Sealed this

Twenty-sixth Day of July, 2005

JON W. DUDAS
*Director of the United States Patent and Trademark Office*